United States Patent [19]

Folkins

[11] Patent Number: 5,089,847
[45] Date of Patent: Feb. 18, 1992

[54] HIGHLIGHT COLOR COPIER

[75] Inventor: Jeffrey J. Folkins, Rochester, N.Y.

[73] Assignee: Xerox Corporation, Stamford, Conn.

[21] Appl. No.: 540,051

[22] Filed: Jun. 19, 1990

[51] Int. Cl.$^5$ .................................... G03G 15/01
[52] U.S. Cl. .................................... 355/202; 355/328; 430/42
[58] Field of Search .............. 355/202, 218, 244, 326, 355/328; 346/157; 430/42

[56] References Cited

U.S. PATENT DOCUMENTS

| 4,027,961 | 6/1977  | Starkweather ........................ 355/202 |
| 4,045,219 | 8/1977  | Bean ..................................... 430/46 |
| 4,236,809 | 12/1980 | Kermisch ............................ 355/326 |
| 4,255,040 | 3/1981  | Weigl et al. ......................... 355/244 |
| 4,374,617 | 2/1983  | Fisli ...................................... 355/202 |
| 4,403,848 | 9/1983  | Snelling .............................. 355/327 |
| 4,660,059 | 4/1987  | O'Brien .............................. 346/157 |
| 4,731,634 | 3/1988  | Stark ................................... 355/328 |
| 4,937,629 | 6/1990  | Maruyama et al. ............. 355/244 X |

FOREIGN PATENT DOCUMENTS

| 61-48871 | 3/1986 | Japan ................................... 355/326 |
| 62-53656 | 3/1986 | Japan ................................... 355/326 |
| 63-98671 | 4/1988 | Japan ................................... 355/326 |

Primary Examiner—Joan H. Pendegrass
Attorney, Agent, or Firm—H. Fleisher; J. E. Beck; R. Zibelli

[57] ABSTRACT

An electrophotographic printing machine in which a color highlighted original document having black indicia and non-black indicia thereon is reproduced in a single cycle. An optical system exposes the charged portion of the photoconductive member to record an optical electrostatic latent image corresponding to the black indicia of the original document. The optical electrostatic latent image is developed with black marking particles. Thereafter, the photoconductive member is recharged and a raster exposure system exposes the charged portion of the photoconductive member to record a raster electrostatic latent image corresponding to the non-black indicia of the original document. The raster electrostatic latent image is then developed with non-black marking particles. The black and non-black marking particles are transferred to a copy sheet and permanently fused thereto forming a highlight color copy of the original document.

10 Claims, 1 Drawing Sheet

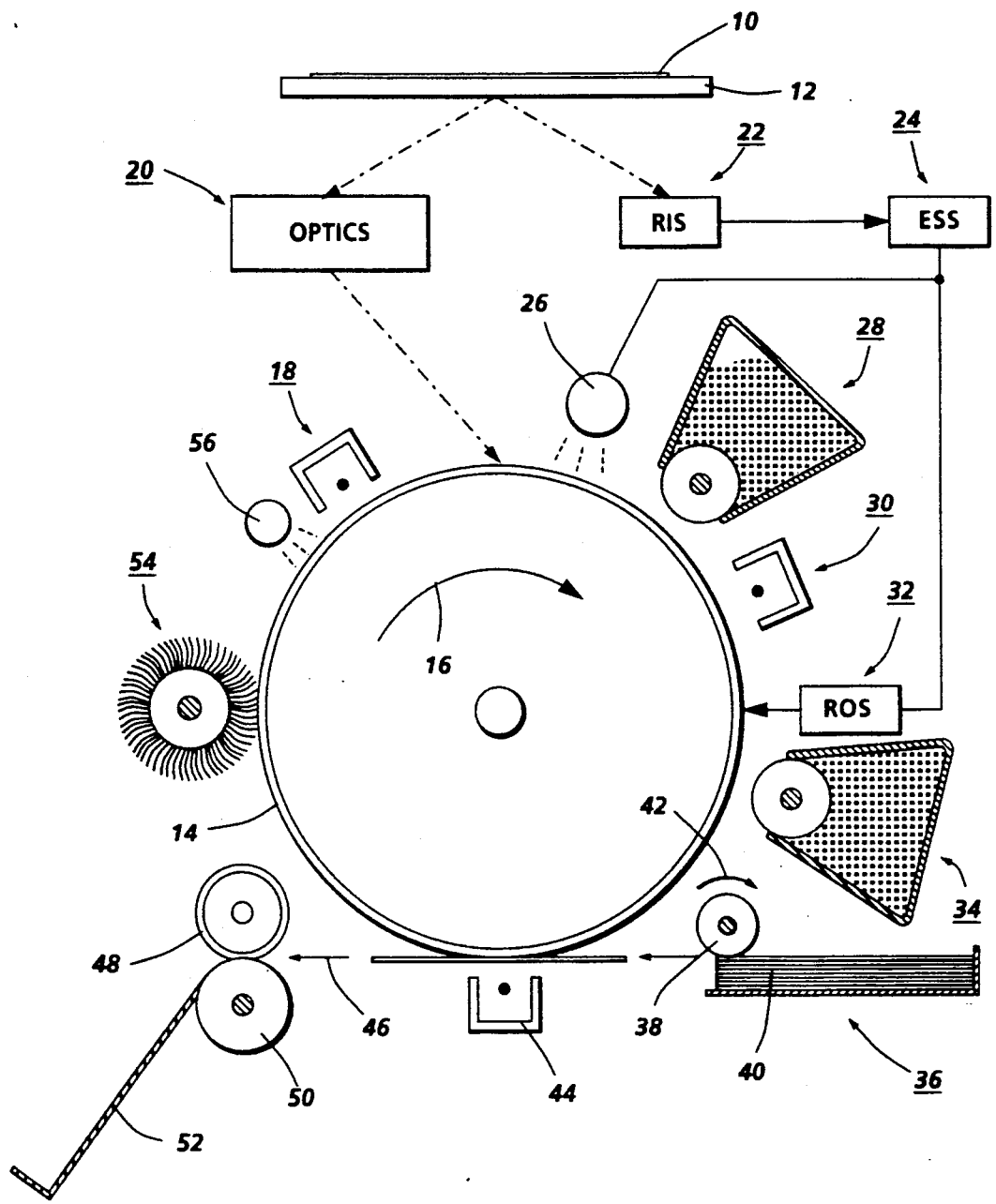

HIGHLIGHT COLOR COPIER

This invention relates generally to a color electrophotographic printing machine, and more particularly concerns reproducing a color highlighted original document having black indicia and non-black indicia thereon.

Frequently, an electrophotographic printing machine processes highlight color original documents to form highlight color copies thereof. In an electrophotographic printing machine, a photoconductive member is charged to a substantially uniform potential to sensitize the surface thereof. The charged portion of the photoconductive member is exposed. Exposure of the charged photoconductive member selectively dissipates the charge thereon in the irradiated areas. This records an electrostatic latent image on the photoconductive member corresponding to the informational areas contained within the original document being reproduced. After the electrostatic latent image is recorded on the photoconductive member, the latent image is developed by bringing toner into contact therewith. This forms a developed toner image on the photoconductive member which is subsequently transferred to a copy sheet. The copy sheet is heated to permanently affix the toner image thereto in image configuration. The foregoing generally describes a conventional black and white electrophotographic printing machine.

Multi-color electrophotographic printing is substantially identical to the foregoing process of black and white printing. However, rather than forming a single latent image on the photoconductive surface, successive latent images corresponding to different colors are recorded thereon. Each single color electrostatic latent image is developed with toner of an associated color. This process is repeated a plurality of cycles for differently colored images and their respective associated colored toner. Each single color toner image is transferred to the copy sheet in superimposed registration with the prior toner image. This creates a multi-layered toner image on the copy sheet. Thereafter, the multi-layered toner image is permanently affixed to the copy sheet creating a color copy. The developer material may be a liquid material or a powder material. Thus, color electrophotographic printing machines previously employed required multiple passes to produce a color copy. For example, copy highlighted with one color would previously require two passes. A typical electrophotographic printing machine employing the foregoing process is manufactured by the Xerox Corporation under the Model No. 1005.

In the area of multi-color electrophotographic printing, it is highly desirable to transfer simultaneously all of the toner powder images to the copy sheet rather than having to do it sequentially. Particularly in the case of highlight color copies, it is desirable to reproduce the text in black indicia with black marking particles and the non-black marking particles with a non-black, colored marking particles. Various approaches have been devised to improve color copying, the following disclosures appear to be relevant:

U.S. Pat. No. 4,027,961
Patentee: Starkweather
Issued: June 7, 1977
U.S. Pat. No. 4,045,219
Patentee: Bean
Issued: Aug. 30, 1977
U.S. Pat. No. 4,236,809
Patentee: Kermisch
Issued: Dec. 2, 1980
U.S. Pat. No. 4,255,040
Patentee: Weigl et al.
Issued: May 10, 1981
U.S. Pat. No. 4,374,617
Patentee: Fisli
Issued: Feb. 22, 1983
U.S. Pat. No. 4,660,059
Patentee: O'Brien
Issued: Apr. 21, 1987
U.S. Pat. No. 4,731,634
Patentee: Stark
Issued: Mar. 15, 1988

The relevant portion of the foregoing patents may be briefly summarized as follows:

U.S. Pat. No. 4,027,961 discloses an electrophotographic printing machine which uses either a raster scanner or an optical system.

U.S. Pat. No. 4,045,219 describes a color electrophotographic printing machine which reproduces an original documents having color highlights therein using an optical exposure system. A latent image corresponding to the black regions of the original document is developed with black toner particles. The black toner image is transferred to a copy sheet. Next, a latent image corresponding to the highlight color region of the original document is developed with non-black toner particles. The non-black toner particles are transferred to the copy sheet forming a highlight color copy.

U.S. Pat. No. 4,236,809 discloses a color copier having an optical exposure system for recording a latent image. The latent image is corrected for tone or color in real time by a parallel raster exposure system. A raster input scanner generates electrical raster image signals representative of the original document. A processor converts electrical correction signals from the raster image signals. A raster output scanner corrects the latent image recorded by the optical system. The raster input scanner uses a charge coupled device to generate the electrical raster signals and the raster output scanner uses a laser.

U.S. Pat. No. 4,255,040 describes a color electrophotographic printing machine which uses an optical system and a laser scanner to record latent images on a photoconductive member. The developed images are transferred to a common sheet in registration with one another. The electronic image corresponds to an overlay.

U.S. Pat. No. 4,374,617 discloses a multi-function document processor using an optical system, and a raster input scanner and raster output scanner for selectively performing photocopying. Shared optics are used to reduce the cost.

U.S. Pat. No. 4,660,059 describes an ionographic printing machine in which ions are projected onto a dielectric roller to record a first electrostatic latent image. This latent image is then developed with black toner particles. A corona generator then neutralizes the charge on the black toner image. Ions are then once again projected onto the dielectric roller to record a second electrostatic latent image which is subsequently developed with red toner particles. The red and black toner particles are transferred simultaneously from the dielectric roller to a sheet.

U.S. Pat. No. 4,731,634 discloses an electrophotographic printing machine in which black and plural highlight color images are reproduced in a single pass. Two of the toners are attracted to one charge level to provide black and one highlight color while two toners are attracted to another charge level to form the second highlight color.

Pursuant to the features of the present invention, there is provided an electrophotographic printing machine for reproducing a color highlighted original document having black indicia and non-black indicia thereon. The printing machine includes a movable photoconductive member. Means are provided for charging a portion of the photoconductive member to a substantially uniform level. Optical exposure means expose the charged portion of the photoconductive member to an optical image of the black indicia of the original document to record an optical electrostatic latent image thereon. Means develop the optical electrostatic latent image recorded on the photoconductive member with marking particles. Means are provided for recharging the portion of the photoconductive member to a substantially uniform level after developing the optical electrostatic latent image with marking particles. Raster exposure means expose the the charged portion of the photoconductive member to a raster image of the non-black indicia of the original document to record a raster electrostatic latent image thereon. The raster electrostatic latent image and the optical electrostatic latent are recorded on the photoconductive member during the the same cycle in registration with one another.

In accordance with another aspect of the present invention, there is provided a method of reproducing an original document having black and non-black indicia thereon. The method includes the steps of charging a portion of a photoconductive member to a substantially uniform level. Next, the charged portion of the photoconductive member is exposed to an optical image of the black indicia of the original document to record an optical electrostatic latent image thereon. The optical electrostatic latent image recorded on the photoconductive member is then developed with marking particles. After developing the optical electrostatic latent image with marking particles, the portion of the photoconductive member is recharged to a substantially uniform level. The recharged portion of the photoconductive member is then exposed to a raster image of the non-black indicia of the original document to record a raster electrostatic latent image thereon. The raster electrostatic latent image and the optical electrostatic latent are recorded on the photoconductive member during the the same cycle in registration with one another.

Other aspects of the present invention will become apparent as the following description proceeds and upon reference to the drawing which illustrates a schematic elevational view of an electrophotographic printing machine incorporating the features of the present invention therein.

While the present invention will hereinafter be described in connection with a preferred embodiment and method of use, it will be understood that it is not intended to limit the invention to that embodiment or method of use. On the contrary, it is intended to cover all alternatives, modifications and equivalents as may be included within the spirit and scope of the invention as defined by the appended claims.

For a general understanding of the features of the present invention, reference is made to the drawing. In the drawing, like references have been used throughout to designate identical elements. The drawing is a schematic elevational view of an illustrative electropohotographic printing machine incorporating the features of the present invention therein. It will become evident from the following discussion that the present invention is equally well suited for use in a wide variety of printing machines, and is not necessarily limited in its application to the particular printing machine shown herein.

Referring now to the drawing, the electrophotographic printing machine has a photoconductive drum 14 made from a polychromatic photoconductive material. Drum 14 rotates in the direction of arrow 16 to advance successive portions of the photoconductive surface sequentially through the various processing stations disposed about the path of movement thereof.

Initially, a portion of photoconductive drum 14 passes through the charging station. At the charging station, a corona generating device, indicated generally by the reference numeral 18 charges photoconductive drum 14 to a relatively high, substantially uniform potential. By way of example, each of the corona generating devices described herein have a coronode wire disposed in a substantially U-shaped shield.

Next, the charged portion of photoconductive drum 14 is advanced to an optical exposure station. At the optical exposure station, an original document 10 having black and non-black indicia thereon is positioned on a platen 12. For example, original document 10 may have black text and red highlight color text on a white background. The charged portion of the photoconductive drum 14 is exposed to a light image of the entire original document 10 by an optical system, indicated generally the reference numeral 20. Optical system 20 has a lamp assembly located beneath platen 12. The lamp assembly in conjunction with a lens system and mirrors moves across original document 10 to project a light image of incremental areas of original document 10 onto the charged portion of photoconductive drum 14. In this way an electrostatic latent image corresponding to the entire original document is recorded on photoconductive drum 14. A raster input scanner (RIS), indicated generally by the reference numeral 22, scans original document 10. One skilled in the art will appreciate that raster scanning and optical scanning need not be done at the same time. For example, the RIS may be integrated with recirculating document handler and the document raster scanned before it reaches the platen. The RIS contains document illumination lamps, optics, a mechanical scanning drive, and a charge coupled device (CCD array). The RIS captures the entire original document and converts it to a series of raster scan lines which are transmitted as electrical signals to an electronic subsystem (ESS), indicated generally by the reference numeral 24. The electrical signals from the RIS correspond to the red, green and blue densities at each point in the original document. The ESS compares the red, blue and green signals for each pixel in the original document. When the signal levels for the red, green, and blue pixels are proportional to one another in a fixed relationship, e.g. low and equal to one another, the pixel will be developed as black. In contradistinction, when the signal levels for the red, green, and blue pixels are high and equal to one another, the pixel corresponds to white. Those pixels wherein at least one of the signals for red, green and blue do not correspond to these relationships correspond to a non-black or colored pixel. In this way, the ESS determines those portions of the original document which are black, white, and nonblack or colored. ESS 24 transmits a signal to erase lamp 26 to energize erase lamp 26 at the appropriate time during the cycle to illuminate those portions of the latent image corresponding to the non-black or colored portions of the original document. The erase lamp is spatially addressable. A suitable erase lamp is a segmented erase lamp or a low resolution raster output scanner (ROS). Illumination of the non-black portions of the electrostatic latent image discharges this portion of the electrostatic latent image with the remaining electrostatic latent image, i.e. the optical electrostatic latent image, corresponding to the black portions of the original document. The optical electrostatic latent image recorded on photoconductive drum 14 is advanced to a development station as drum 14 rotates in the direction of arrow 16.

The development station includes a developer unit, indicated generally by the reference numeral 28. Developer unit 28 deposits black marking or toner particles on the optical electrostatic latent image. By way of example, developer unit 28 includes a hopper storing a supply of developer material comprising carrier granules having toner particles adhering triboelectrically thereto. The developer material is advanced to a rotating, non-magnetic sleeve. A stationary magnetic sleeve is disposed interiorly of the rotating sleeve. The developer material is advanced to the development zone by the rotating sleeve. The optical electrostatic latent image attracts the black toner particles from the carrier granules thereto to form a black toner powder image on photoconductive drum 14. Thereafter, this portion of the photoconductive drum rotates to a recharging station.

At the recharging station, a corona generating device, indicate generally by the reference numeral 30 recharges that portion of the photoconductive drum to a substantially uniform level. The recharged portion of the photoconductive drum advances to the raster exposure station.

At the raster exposure station, a raster output scanner (ROS), indicated generally by the reference numeral 32, discharges selectively those portions of the recharged portion corresponding to the non-black portions of the original document. As previously mentioned, the RIS has scanned the original document and converted it to a series of raster scan lines which are transmitted as electrical signals to the ESS. The ESS compares the red, green and blue densities for each pixel in the original document. Those pixels wherein at least one of the signals for red, green and blue do not correspond to the fixed relationship therebetween correspond to non-black pixels. These signals are transmitted to ROS 32. ROS 32 includes a laser with rotating polygon mirror blocks. Alternatively, ROS 32 may include light emitting diodes. The ROS is controlled by the ESS to illuminate the recharged portion of the photoconductive drum in those regions wherein at least one of the signals for red green and blue does not correspond to the fixed relationship. The ROS illuminates the recharged portion of photoconductive drum 14 at a rate of about 300 pixels per inch. In this way, a raster electrostatic latent image is recorded on the photoconductive drum which corresponds to the non-black image portions of the original document. After the raster electrostatic latent image is recorded on the recharged portion of the photoconductive drum, drum 14 rotates the raster electrostatic latent image to another development station.

At the next development station, a developer unit, indicated generally by the reference numeral 34. Developer unit 34 deposits non-black marking or toner particles, e.g. red toner particles, on the raster electrostatic latent image. By way of example, developer unit 28 includes a hopper storing a supply of developer material comprising carrier granules having red toner particles adhering triboelectrically thereto. The developer material is advanced to a rotating, non-magnetic sleeve. A stationary magnetic sleeve is disposed interiorly of the rotating sleeve. The developer material is advanced to the development zone by the rotating sleeve. The raster electrostatic latent image attracts the red toner particles from the carrier granules thereto to form a red toner powder image on photoconductive drum 14. The red toner image is in registration with the black toner image previously developed on photoconductive drum 14. Thus, a composite toner powder image having black and red portions has been developed on photoconductive drum 14. Development unit 28 and development unit 34 are non-interactive in that development by developer unit 34 does not disturb the previous toner image developed on the photoconductive drum 14 by developer unit 34. After developer unit 34 develops the latent image, drum 14 rotates the composite toner powder image to the transfer station.

A sheet feeding apparatus, indicated generally by the reference numeral 36, includes a feed roll 38 contacting the uppermost sheet of a stack of sheets 40, such as plain paper amongst others. Feed roll 38 rotates in the direction of arrow 42 to advance the the uppermost sheet to the transfer station in a timed sequence with the advancement of the composite toner image on the photoconductive drum thereto.

At the transfer station, a corona generating device 44 sprays ions onto the backside of the sheet so as to charge the sheet to a polarity opposite to that of the charge on the composite toner image. In this way, the sheet is charged to the proper magnitude and polarity for attracting the composite toner image from photoconductive drum thereto. After the composite toner image is transferred to the sheet, the sheet, in the direction of arrow 46, to the fusing station.

At the fusing station, the transferred composite toner image is permanently fused to the sheet. The fusing station includes a heated fuser roll 48 and a pressure roll 50. The sheet passes through the nip defined by fuser roll 48 and pressure roll 50. The composite toner image contacts fuser roll 48 so as to be affixed to the sheet. Thereafter, the sheet is advanced to catch tray 52 for subsequent removal therefrom by the machine operator.

The last processing station in the direction of drum 14, as indicated by arrow 16, is the cleaning station. A rotatably mounted fibrous brush 54 is positioned in the cleaning station and maintained in contact with photoconductive drum 14 to remove residual toner particles remaining after the transfer operation. Thereafter, lamp 56 illuminates photoconductive drum 14 to remove any residual charge remaining thereon prior to the start of the next successive cycle.

In recapitulation, the printing machine of the present invention reproduces a color highlighted original document in a single cycle. The printing machine has an optical system to record an optical electrostatic latent image of the black portion of the original document on a photoconductive member. The optical electrostatic latent image is developed with black toner particles and that portion of the photoconductive member recharged to a substantially uniform level. A raster scan system records a raster electrostatic latent image on the photoconductive member in registration with the optical electrostatic latent image. The raster electrostatic latent image is developed with nonblack toner particles to form a composite toner powder image on the photoconductive member. The composite toner image is transferred from the photoconductive member to a copy sheet forming a color highlighted copy of the original document. One skilled in the art will appreciate that the present invention is not limited to one highlight color, but rather multiple highlight colors may be formed on the copy by using an algorithm with the RIS for determining color.

It is, therefore, evident that there has been provided in accordance with the present invention, a electrophotographic printing machine that fully satisfies the aims and advantages hereinbefore set forth. While this invention has been described in conjunction with a specific embodiment and method of use, it is evident that many alternatives, modifications and variations will be apparent to those skilled in the art. Accordingly, it is intended to embrace all such alternatives, modifications and variations as fall within the spirit and broad scope of the appended claims.

I claim:

1. An electrophotographic printing machine for reproducing a color highlighted original document having black indicia and non-black indicia thereon, including:
   a movable photoconductive member;
   means for charging a portion of said photoconductive member to a substantially uniform level;
   optical exposure means comprising:
   (a) a light source for illuminating the original document;
   (b) lens means, positioned to receive the light rays reflected from the original document, for projecting a light image of the original document onto the charged portion of said photoconductive member to record an electrostatic latent image thereon; and
   (c) means for illuminating the portion of the electrostatic latent image corresponding to the non-black indicia of the original document to discharge that portion of the electrostatic latent image with the remaining portion of the electrostatic latent image forming the optical electrostatic latent image corresponding to the black indicia of the original document;
   means for developing the optical electrostatic latent image recorded on said photoconductive member with marking particles;
   means for recharging the portion of said photoconductive member to a substantially uniform level after developing the optical electrostatic latent image with marking particles; and
   a raster exposure means comprising:
   (a) raster input scanner adapted to scan the original document to form a series of raster scan lines as electrical signals;
   (b) a controller, in communication with said raster input scanner, for receiving the electrical signals from said raster input scanner and, in response thereto, determining those portions of the original document having black indicia thereon and those portions of the original document having non-black indicia thereon and transmitting a control signal corresponding thereto; and
   (c) a raster output scanner, responsive to the control signal from said controller, for illuminating the charged portion of said photoconductive member to record the raster electrostatic latent image thereon corresponding to the non-black regions of the original document.

2. A printing machine according to claim 1, further including means for developing the raster electrostatic latent image with marking particles of a color other than the color of the marking particles developing the optical electrostatic latent image.

3. A printing machine according to claim 2, further including means for transferring the marking particles from said photoconductive member to a sheet.

4. A printing machine according to claim 3, further including means for fusing the marking particles to the sheet to form a highlight color copy of the original document.

5. A printing machine according to claim 1, wherein:
   said optical latent image developing means develops the optical latent image with black marking particles; and
   said raster latent image developing means develops the raster latent image with non-black marking particles.

6. A method of reproducing an original document having black and non-black indicia thereon, including the steps of:
   charging a portion of a photoconductive member to a substantially uniform level;
   exposing the charged portion of the photoconductive member to an optical image of the black indicia of the original document to record an optical electrostatic latent image comprising the steps of:
   (a) illuminating the original document with a light source;
   (b) receiving the light rays reflected from the original document on a lens and projecting a light image of the original document onto the charged portion of the photoconductive member to record an electrostatic latent image thereon; and
   (c) illuminating the portion of the electrostatic latent image corresponding to the non-black indicia of the original document to discharge that portion of the electrostatic latent image with the remaining portion of the electrostatic latent image being the optical electrostatic latent image corresponding to the black indicia of the original document;
   developing the optical electrostatic latent image recorded on the photoconductive member with marking particles;
   recharging the portion of the photoconductive member to a substantially uniform level after developing the optical electrostatic latent image with marking particles; and
   exposing the recharged portion of the photoconductive member to a raster image comprising the steps of:
   (a) scanning the original document with a raster input scanner to form a series of raster scan lines;
   (b) converting the raster scan lines to electrical signals;
   (c) transmitting the electrical signals to a controller;

(d) determining, in response to the electrical signals transmitted to the controller, those portions of the original document having black indicia thereon and those portions of the original document having non-black indicia thereon;

(e) transmitting a control signals, corresponding to those portions of the original document having non-black indicia thereon, to a raster output scanner; and (f) illuminating, responsive to the control signal, the charged portion of the photoconductive member to record the raster electrostatic latent image thereon corresponding to the non-black regions of the original document.

7. A method of printing according to claim 6, further including the step of developing the raster electrostatic latent image with marking particles of a color other than the color of the marking particles developing the optical electrostatic latent image.

8. A method of printing according to claim 7, further including the step of transferring the marking particles from the photoconductive member to a sheet.

9. A method of printing according to claim 8, further including the step of fusing the marking particles to the sheet to form a highlight color copy of the original document.

10. A method of printing according to claim 6, wherein:

said step of developing the optical latent image develops the optical latent image with black marking particles; and said step of developing the raster latent image develops the raster latent image with non-black marking particles.

* * * * *